United States Patent

[11] 3,537,475

| [72] | Inventor | Eugene A. Pottinger |
| | | Louisville, Kentucky |
| [21] | Appl. No. | 769,003 |
| [22] | Filed | Oct. 21, 1968 |
| [45] | Patented | Nov. 3, 1970 |
| [73] | Assignee | General Electric Company |
| | | a corporation of New York |

[54] VALVE ASSEMBLY
6 Claims, 5 Drawing Figs.

[52] U.S. Cl................................................ 137/613,
251/45, 137/612.1
[51] Int. Cl..................................................... F16k 31/365
[50] Field of Search........................................ 137/613,
594, 612.1, 157, 139, 415, 413; 251/129, 174,
45(X), 141, 38

[56] References Cited
UNITED STATES PATENTS

| 2,473,465 | 6/1949 | Betz ............................. | 137/614.11 |
| 2,644,662 | 7/1953 | Powers ......................... | 137/613 |
| 2,705,608 | 4/1955 | Phillips......................... | 137/612.1 |
| 2,982,304 | 5/1961 | Bauerlein ..................... | 137/612.1 |
| 3,100,504 | 8/1963 | Kauer........................... | 137/613 |
| 3,275,033 | 9/1966 | Kozel .......................... | 137/613 |

*Primary Examiner*—William F. O'Dea
*Assistant Examiner*—William H. Wright
*Attorneys*—James E. Espe, Harry F. Manbeck, Jr., Oscar B. Waddell, Melvin M. Goldenberg and Frank L. Neuhauser ABSTRACT: A pilot-controlled valve assembly employing downstream and upstream series connected valve seats and cooperating valve members whereby flow control is normally effected by the downstream valve seat and valve member, but upon their failure to close, the upstream valve seat and valve member will automatically function to effect closure.

Patented Nov. 3, 1970

3,537,475

INVENTOR.
EUGENE A. POTTINGER
BY James E. Espe
HIS ATTORNEY

VALVE ASSEMBLY

BACKGROUND OF THE INVENTION

BACKGROUND OF THE INVENTION

This invention relates generally to flow control mechanisms and, more specifically, to a valve mechanism particularly adapted to minimize leakage and insure proper closure even though used to control fluids containing limited amounts of foreign matter.

A valve mechanism of the type involved herein is particularly useful with an automatic washer wherein it is desirable to provide a reliable flow control device to control the admission of water to the washer. The water available from the normal household water supply may contain sand, calcium deposits or other foreign matter which can come to rest across the valving surface or valve seat, and thereby prevent proper closure thus causing leakage. Prior art devices have attempted to overcome this problem through the provision of two or more complete, independently actuated valves arranged in series whereby if one of the valves was blocked open by debris, the other valve would provide the desired flow control. However, this solution has proven unduly expensive as it requires two entirely separate and complete, independently actuated valve mechanisms.

An object of this invention is to provide a new and improved valve mechanism employing series connected upstream and downstream valve seats and a closure system of extremely simple and economical design which, when actuated, will attempt to close the downstream valve seat, and, in failing to do so, will additionally attempt to close the upstream valve seat.

SUMMARY OF THE INVENTION

Briefly stated, in accordance with one aspect of this invention, there is provided a valve assembly having a casing with an inlet, an outlet and a pair of valve seats, one upstream and one downstream, connected in series flow relation between the inlet and the outlet. Two valve members are supported in the casing, for individually shutting off the flow through each of the valve seats. A chamber means is formed within the casing adjacent the valve members. A bleed means is provided for introducing fluid from the inlet into the chamber means to force at least one of the valve members into engagement with its valve seat. A control passageway is provided between the outlet and the chamber means for releasing fluid from the chamber means to allow the valve members to open. Additionally, means are provided for opening and closing the control passageway thereby to cause the downstream valve member to attempt closure, and if the downstream valve member fails to close, to additionally cause the upstream valve member to attempt closure.

BRIEF DESCRIPTION OF THE DRAWING

While the specification concludes with claims particularly pointing out and distinctly claiming the subject matter which is regarded as the invention, it is believed the invention will be better understood from the following description of the preferred embodiments taken in connection with the accompanying drawing, in which:

DESCRIPTION OF THE PREFERRED EMBODIMENT

Figure 1:
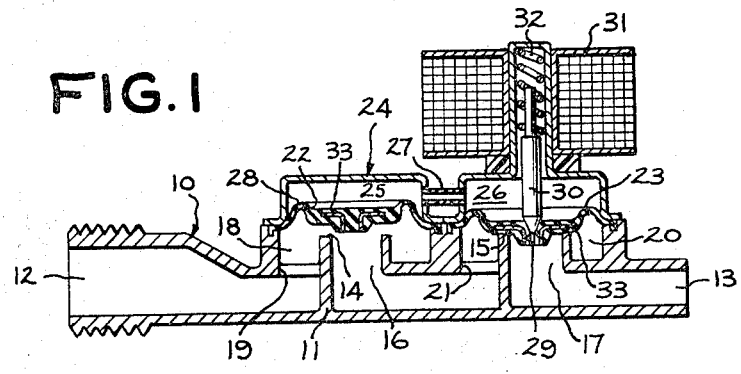
FIG. 1 is a sectional view showing a flow control device embodying my invention, with the device in its normally closed condition.

Referring now to the drawing, and initially to FIG. 1 thereof, there is illustrated a valve assembly 10 having a casing 11 with an inlet 12 and an outlet 13. An upstream valve seat 14 and a downstream valve seat 15 are formed within casing 11 in series flow relation between inlet 12 and outlet 13. Valve seat 14 defines one end of a generally circular passageway 16 and valve seat 15 similarly defines one end of a generally circular passageway 17. Once the valve assembly is in its open position, passageway 16 communicates with inlet 12 by means of a generally annular compartment 18 and an opening 19 in casing 11. Similarly, passageway 17 communicates with passageway 16 by means of a generally annular compartment 20 and an opening 21 when the valve assembly is in its open position.

Communication between passageway 16 and compartment 18 is controlled by a valve member which, in the preferred form of the present invention, comprises a flexible diaphragm 22 which is secured about its periphery to casing 11. A second flexible diaphragm 23 is similarly secured about its periphery to casing 11. Diaphragm 22 is disposed to overlie upstream valve seat 14 and compartment 18 while diaphragm 23 overlies downstream valve seat 15 and compartment 20. Each of the diaphragms may contain one or more strengthening metal inserts 33 of substantially the same diameter as valve seats 14 and 15 to facilitate sealing engagement between the diaphragms and valve seats.

A cover assembly 24 defines chamber means in the form of chambers 25 and 26 which, respectively, overlie diaphragms 22 and 23. Chambers 25 and 26 are interconnected by a pressure equalization means or conduit 27 which tends to maintain substantially equal pressures within chambers 25 and 26.

Figure 2:
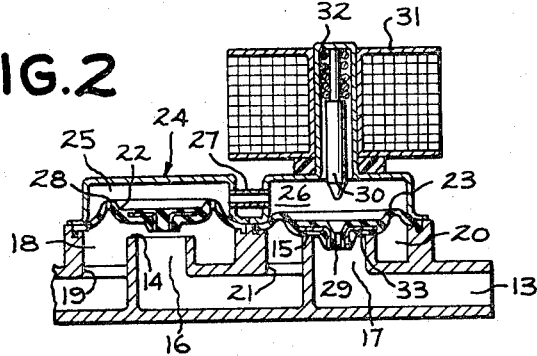
FIG. 2 is a view similar to FIG. 1 but showing the device in its second stage of opening.

Diaphragm 22 is provided with at least one bleed means or orifice 28 which interconnects chamber 25 with compartment 18 which in turn, of course, communicates with inlet 12 so that chamber 25 is in constant communication with inlet 12. Diaphragm 23 has at least one opening or control passageway 29 therethrough which interconnects chamber 26 with passageway 17. Because passageway 17 is in direct and constant communication with outlet 13, control passageway 29 thus connects chamber 26 to the outlet 13. Means are provided for opening and closing control passageway 29 and, in the preferred form of the present invention, comprises a pilot member 30 mounted for reciprocal movement within chamber 26 between a closed position, as illustrated in FIG. 1, and an open position as illustrated in FIG. 2. Reciprocation or movement of pilot member 30 is effected by forming pilot member 30 as the armature of a solenoid 31. A spring 32 is positioned to exert a force on pilot member 30 to urge it toward the closed position. With such an arrangement, as solenoid 31 is electrically energized from a suitable electrical source not shown, pilot member 30 is moved to open control passageway 29 against the force of spring 32. When solenoid 31 is deenergized, spring 32 moves pilot member 30 to close passageway 29.

Figure 3:
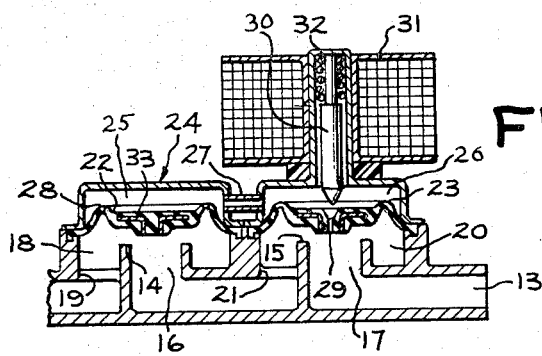
FIG. 3 is a view similar to FIG. 1 but showing the device in the fully open position.

During operation of the valve assembly, inlet 12 is, of course, connected to a source of fluid under pressure and outlet 13 is connected to a receptacle or other device, the admission of fluid to which is to be controlled by the valve assembly 10. By this arrangement, the fluid pressure at inlet 12 and in compartment 18 is greater than that at outlet 13 and passageway 17. Referring to FIG. 3 which shows the valve mechanism in its fully open position, it will be seen that, in effect, two paths of fluid flow are provided between inlet 12 and outlet 13. A primary flow path is provided through opening 19, compartment 18, valve seat 14, passageway 16, opening 21, compartment 20, valve seat 15 and passageway 17. A secondary or pilot flow path is provided between compartment 18 and passageway 17 through orifice 28, chamber 25, conduit 27, chamber 26 and opening 29. In the fully open configuration of FIG. 3, the same pressure drop from inlet 12 to outlet 13 is experienced along both flow paths.

Figure 4:
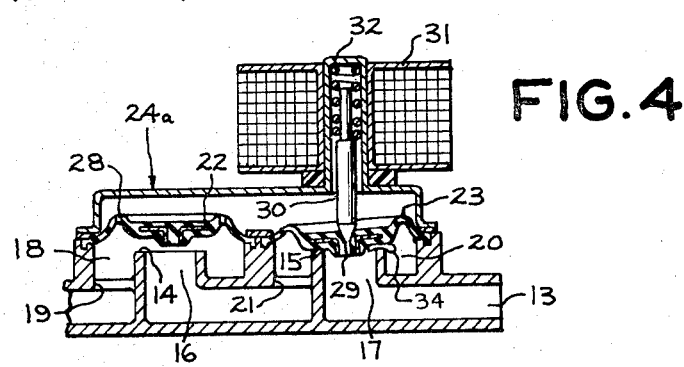
FIG. 4 is a sectional view of a modification of my flow control device showing the device attempting closure when the normally functioning downstream valve seat is blocked by debris.

It should be noted that the surface area of each of the diaphragms 22 and 23 which faces the chambers 25 and 26 is equal to the surface area of the opposite sides of these diaphragms which face passageways 16 and 17, and compartments 18 and 20. Whenever pilot member 30 is seated in opening 29, the pressure in chambers 25 and 26 rises until it becomes substantially equal to the pressure at inlet 12. Such increased pressure on the surface area of each of the diaphragms facing chambers 25 and 26 urges both diaphragms toward closure. However, since a pressure differential exists across the primary flow path between inlet 12 and outlet 13, a lower pressure is exerted on the surface of downstream diaphragm 23, which faces compartment 20 and passageway 17, than is exerted on the surface of upstream diaphragm 22 which faces compartment 18 and passageway 16. Therefore, downstream diaphragm 23 is urged toward closure more rapidly than is upstream diaphragm 22. If downstream diaphragm 23 is able to effect closure of valve seat 15 as shown in FIG. 1, the pressure within passageway 16 and compartment 18 will rise until it becomes substantially equal to the pressure at inlet 12 and chamber 25, thereby equalizing the pressures on both surfaces of upstream diaphragm 22 and alleviating its tendency toward closure on the upstream valve seat. However, if downstream diaphragm 23 is unable to effect closure due to debris 34 blocking valve seat 15 as shown in FIG. 4, the pressure within passageway 16 will not rise to the level of pressure within chamber 25 and the higher pressure acting on the surface of diaphragm 22 facing chamber 25 will urge diaphragm toward closure of valve seat 14 as shown in FIG. 5.

Figure 5:
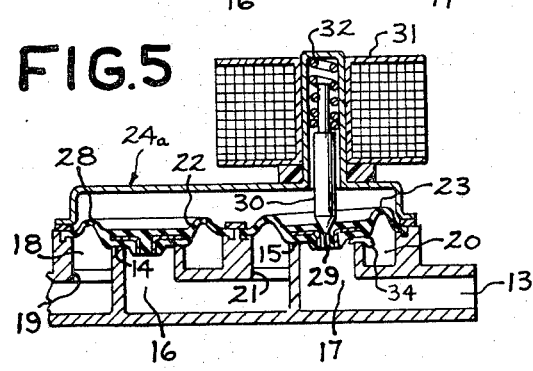
FIG. 5 is a view similar to FIG. 4 showing the upstream valve member effecting closure when the downstream valve seat is blocked by debris.

To open the valve assembly from either the normally closed position of FIG. 1 or the auxiliary closed position of FIG. 5, solenoid 31 is energized which withdraws pilot member 30 from opening 29 as shown in FIG. 2. When this occurs, the pressure in chambers 25 and 26 is relieved permitting diaphragms 22 and 23 to re-open to the configuration of FIG. 3 wherein any debris which may have been present in the valve is given an opportunity to wash away.

The valve assembly is closed by deenergization of solenoid 31 which allows spring 32 to move pilot member 30 into closing relationship with opening 29. As this occurs, there will once again be a buildup of pressure in chambers 25 and 26 to force either diaphragm 22 or diaphragm 23 into engagement with valve seat 14 or 15.

As mentioned earlier a valve mechanism of the type involved herein is particularly useful with an automatic washer wherein it is desirable to provide a reliable control of admission of water to the washer. The water available from the normal household water supply may contain sand, calcium deposits or other foreign matter which can come to rest on the valve seat and there prevent proper closure of the valve. From the foregoing description it should now be apparent that the present invention significantly increases the reliability of control inasmuch as the presence of a limited amount of foreign matter on either one of valve seats 14 or 15 would not cause malfunction of the valve because the diaphragm associated with the other valve seat will be forced into closing relationship with its valve seat. A significant aspect of the present invention is that this reliability is obtained with the use of a single solenoid and pilot member.

As illustrated in FIG. 4, it is within the spirit of the present invention in its broader aspects to provide a common chamber means above diaphragms 22 and 23 as defined by cover assembly 24a. This arrangement would replace individual chambers 25 and 26 and conduit 27 of the embodiment illustrated in FIG. 1.

As will be evident from the foregoing description, certain aspects of the invention are not limited to the particular details of construction of the examples illustrated, and it is therefore contemplated that various other modifications or applications will occur to those skilled in the art. It is therefore intended that the appended claims shall cover such modifications and applications as do not depart from the true spirit and scope of the invention.

I claim:
1. A valve assembly comprising:
casing means having an inlet and an outlet, and a downstream valve seat and an upstream valve seat connected in series flow relation between said inlet and said outlet;
a pair of valve members supported by said casing means;
one of said valve members being arranged to engage said downstream valve seat to shut off flow therethrough, and the other of said valve members being arranged to engage said upstream valve seat to shut off flow therethrough;
chamber means formed in said casing means adjacent said valve members;
bleed means for introducing fluid into said chamber means from said inlet at substantially inlet pressure to force at least one of said valve members into engagement with one of said valve seats;
a control passageway leading from said chamber means to said outlet for releasing fluid from said chamber means to allow said valve members to open;
means for opening and closing said control passageway thereby to cause attempted closure of said downstream valve seat, and in failing to effect closure, to additionally attempt closure of said upstream valve seat; and
whereby the control of flow through said valve is maintained even if said one of said valve members should fail to close onto said downstream valve seat.

2. The valve assembly of claim 1 wherein said chamber means comprises two separate chambers, one adjacent each of said valve members and a pressure equalization conduit interconnecting said chambers.

3. The valve assembly of claim 1 wherein said valve members comprise diaphragms.

4. The valve assembly in claim 1 wherein said bleed means comprises at lease one orifice in said other of said valve members.

5. The valve assembly of claim 4 wherein said control passageway comprises a single opening in said one of said valve members and said means for opening and closing said control passageway comprises a pilot member movably mounted with said casing.

6. A pilot-controlled valve assembly comprising:
casing means having an inlet and an outlet, and a downstream valve seat and an upstream valve seat connected in series flow relation between said inlet and said outlet;
a pair of diaphragms supported by the casing means;
one of said diaphragms being arranged to engage said downstream valve seat to shut off the flow therethrough, and the other of said diaphragms being arranged to engage said upstream valve seat to shut off the flow therethrough;
chamber means formed in said casing means adjacent said diaphragms, said chamber means comprising two separate chambers, one adjacent each of said diaphragms, and a pressure equalization conduit interconnecting said chambers;
bleed means comprising at least one orifice in said other of said diaphragms for introducing fluid into said chamber means from said inlet at substantially inlet pressure to force at least one of said diaphragms into closing relationship with one of said valve seats;
a single control passageway leading from said chamber means to said outlet comprising an opening in said one of said diaphragms, for releasing fluid from said chamber means to allow said diaphragms to open;
means for opening and closing said control passageway comprising a pilot member movably mounted within said casing, thereby to cause attempted closure of said downstream valve seat, and in failing to effect closure, to additionally attempt closure of said upstream valve seat; and
whereby the control of flow through said valve is maintained even if said one of said diaphragms should fail to close onto said downstream valve seat.